US008847182B2

(12) United States Patent
Lambert et al.

(10) Patent No.: US 8,847,182 B2
(45) Date of Patent: Sep. 30, 2014

(54) EUV RADIATION GENERATING APPARATUS AND OPERATING METHODS

(71) Applicant: Trumpf Laser- und Systemtechnik GmbH, Ditzingen (DE)

(72) Inventors: Martin Lambert, Korb (DE); Andreas Enzmann, Villingen-Schwenningen (DE)

(73) Assignee: TRUMPF Laser— und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 13/834,108

(22) Filed: Mar. 15, 2013

(65) Prior Publication Data

US 2014/0084186 A1 Mar. 27, 2014

(30) Foreign Application Priority Data

Sep. 24, 2012 (DE) ........................ 10 2012 217 120

(51) Int. Cl.
*G01N 21/00* (2006.01)
*G01N 21/33* (2006.01)
*H05G 2/00* (2006.01)

(52) U.S. Cl.
CPC .................................... *H05G 2/008* (2013.01)
USPC .... 250/504 R; 250/365; 250/372; 250/493.1; 156/345.5

(58) Field of Classification Search
USPC ......... 250/504 R, 365, 372, 493.1; 156/345.5
See application file for complete search history.

(56) References Cited

U.S. PATENT DOCUMENTS

| | | | | |
|---|---|---|---|---|
| 7,491,954 B2 * | 2/2009 | Bykanov et al. | .......... | 250/504 R |
| 7,928,417 B2 * | 4/2011 | Ershov et al. | ............. | 250/504 R |
| 8,173,985 B2 | 5/2012 | Bergstedt et al. | | |
| 2008/0087847 A1 | 4/2008 | Bykanov et al. | | |
| 2010/0024980 A1 * | 2/2010 | Ershov et al. | ............ | 156/345.24 |
| 2010/0025231 A1 | 2/2010 | Moriya et al. | | |
| 2011/0140008 A1 | 6/2011 | Bergstedt et al. | | |
| 2011/0188011 A1 | 8/2011 | Ehm et al. | | |
| 2013/0250402 A1 * | 9/2013 | Nowak et al. | ............ | 359/341.33 |

FOREIGN PATENT DOCUMENTS

| | | | |
|---|---|---|---|
| DE | 102008028868 | A1 | 12/2009 |
| EP | 1729550 | A2 | 12/2006 |
| WO | WO2010059210 | A2 | 5/2010 |
| WO | WO2011130327 | A1 | 10/2011 |
| WO | WO2012012267 | A1 | 1/2012 |
| WO | WO2012050685 | A1 | 4/2012 |
| WO | 2013083335 | A2 | 6/2013 |

OTHER PUBLICATIONS

International Search Report from corresponding PCT Application No. PCT/EP2013/002817, mailed Nov. 21, 2013, 6 pages.

* cited by examiner

*Primary Examiner* — Nikita Wells
(74) *Attorney, Agent, or Firm* — Fish & Richardson P.C.

(57) ABSTRACT

The invention relates to extreme ultraviolet “EUV” radiation generating systems that include a vacuum chamber where a target material can be positioned at a target position for generation of EUV radiation, and a beam guiding chamber for guiding a laser beam from a driver laser device towards the target position. The EUV radiation generating apparatus includes an intermediate chamber which is arranged between the vacuum chamber and the beam guiding chamber, a first window which seals the intermediate chamber in a gas-tight manner for entry of the laser beam from the beam guiding chamber and a second window which seals the intermediate chamber in a gas-tight manner for exit of the laser beam into the vacuum chamber. The invention also relates to a method for operating the EUV radiation generating apparatus.

17 Claims, 1 Drawing Sheet

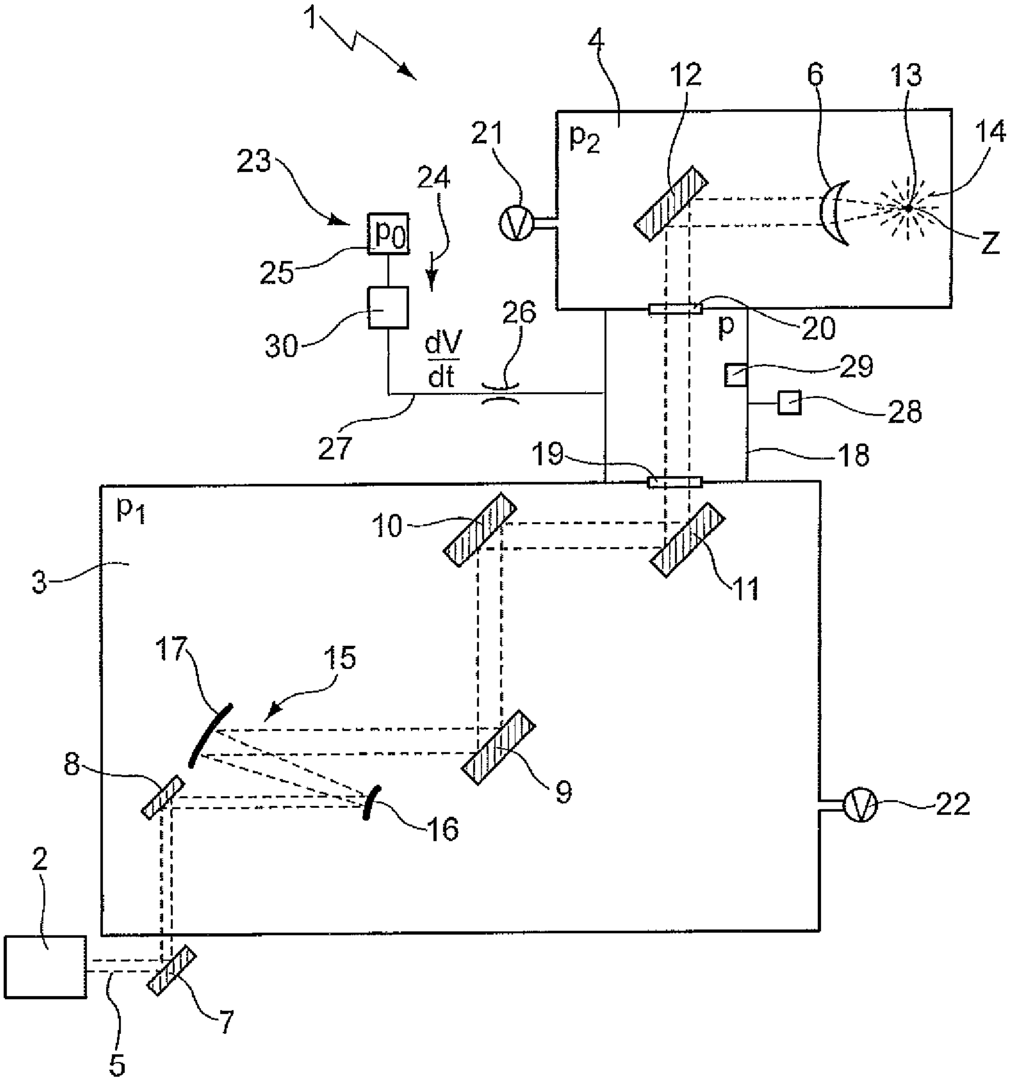
1
4
12
6
13
14
21
p2
23
24
p0
25
Z
30
dV/dt
26
20
p
29
28
27
19
18
p1
10
11
3
17
15
8
9
16
22
2
7
5

EUV RADIATION GENERATING APPARATUS AND OPERATING METHODS

TECHNICAL FIELD

The present invention relates to extreme ultraviolet ("EUV") radiation generating systems and methods.

BACKGROUND

An EUV radiation generating apparatus having a beam guiding device for guiding a laser beam to a target position is known from US 2011/0140008 A1. The beam guiding device described therein is used to guide laser radiation that has been produced and amplified in a driver laser system. Generally a $CO_2$ laser is used as the driver laser, because it allows a high level of conversion efficiency between the input power of the driver laser and the output power of the produced EUV radiation with specific target materials, for example, tin. The beam guiding device guides the laser beam to a focusing element or a focusing device which is used to focus the laser beam at the target position. There is provided at the target position a target material that changes into a plasma state during irradiation with the laser beam and emits EUV radiation.

During irradiation with the laser beam, a portion of the target material (for example, tin) is typically vaporized and may be deposited on the optical surfaces of optical elements that are arranged in the vicinity of the target position. Laser beams having a relatively large wavelength of, for example, approximately 10.6 μm (e.g., when using a $CO_2$ laser), will generally be reflected by optical elements that have a comparatively rough optical surface caused by such tin deposits. However, in optical elements that serve to reflect EUV radiation (with a much smaller wavelength) produced at the target position, this is not generally the case, because deposits of contaminating materials on those optical elements typically result in a significant reduction in the reflectivity for the EUV radiation used. Thus, optical elements for use with EVU radiation that are arranged in subassemblies in a vacuum chamber or arranged downstream thereof, for example, an illumination system and optical elements arranged in a projection system, should be protected from such contaminating materials, in particular deposits of the target material.

SUMMARY

The present invention relates to EUV radiation generating systems or apparatus that include a vacuum chamber where a target material can be positioned at a target position for generation of EUV radiation, and a beam guiding chamber for guiding a laser beam from a driver laser device towards the target position. The invention also relates to methods for operating such EUV radiation generating systems so that their operational reliability is increased.

In general, the invention provides an EUV radiation generating apparatus or system that includes a laser source to generate a laser beam; a vacuum chamber; a laser beam guiding chamber arranged to guide the laser beam from the laser source to a target position within the vacuum chamber where a target material can be positioned for generation of EUV radiation; and an intermediate chamber arranged between the vacuum chamber and the beam guiding chamber, wherein the intermediate chamber includes a first window arranged for entry of the laser beam from the laser beam guiding chamber into the intermediate chamber; and a second window arranged for exit of the laser beam from the intermediate chamber into the vacuum chamber, wherein the first and second windows provide a gas-tight seal for the intermediate chamber.

The vacuum chamber is separated from the environment by the second window in a sealing manner. If the second window is destroyed or if the sealing of the second window is defective, gas from the environment may flow into the vacuum chamber, because a lower pressure is present in the vacuum chamber than in the environment, for example, in the beam guiding system. The window and the sealing thereof consequently constitute potential sources of leaks. A small leakage affects the environment in the vacuum chamber only as a simple error. A sudden failure of the window with a large leakage results in relatively large gas quantities flowing into the vacuum environment, which produces a gas flow therein that may pass through the entire vacuum environment. Because of a non-tight window, not only gas, but also liquid substances, for example, cooling water which is used for cooling the window, may be introduced into the vacuum chamber or the beam guiding chamber.

The second window is in the proximity of the target position with the target material, at which a portion of the target material is in the gas phase and is carried along by the gas flow in the event of a sudden failure of the window. This is particularly problematic, because the target material or, where applicable, additional carried contaminating substances, can be transported by the EUV radiation generating apparatus into an illumination system or projection system that follows in the beam path of the EUV radiation, which typically have a very clean environment. Contamination of this environment with the target material can in the worst case result in a total failure of the EUV lithography system, because the target material becomes deposited on the optical elements arranged therein and they may not be able to be completely cleaned any more.

To prevent the introduction of relatively large gas quantities into the vacuum chamber if the second window fails suddenly, it is proposed according to the invention to use an additional (first) window, which is connected in series with the second window. If the second window fails, only the (small) gas volume present in the intermediate space can be introduced into the vacuum chamber, which only results in a comparatively slight impairment of the EUV lithography system due to the substantially greater volume of the vacuum chamber. Since a simultaneous failure of both windows is extremely improbable, the operational reliability of the EUV radiation generating apparatus can be substantially increased by means of the intermediate chamber.

In one embodiment, the beam guiding chamber has a higher pressure (p1) than the environment outside the EUV radiation generating apparatus, atmospheric pressure (e.g., 1013 mbar) typically being present in the environment of the EUV radiation generating apparatus. Components arranged in the beam guiding chamber, for example, optical units, can already be effectively protected from contamination that would otherwise be introduced into the beam guiding chamber from the environment of the EUV radiation generating apparatus by a comparatively small excess pressure of, for example, 5 mbar or 10 mbar.

In one embodiment, the EUV radiation generating apparatus has a feeding device arranged to supply a test gas to the intermediate chamber and a leakage monitoring device arranged to monitor a leak of the supplied test gas from the intermediate chamber. It is advantageous to act on the intermediate chamber with a test gas, in particular with an inert gas, for example, with nitrogen or argon, in order to detect a leak of the intermediate chamber and therefore an insufficient sealing between the beam guiding chamber and the vacuum chamber. The influence that a small leak has on the optical elements in the vacuum environment can further be reduced by using a suitable inert test gas. The detection or monitoring of the leak can be carried out, for example, by monitoring the test gas pressure in the intermediate chamber and/or by detecting the test gas quantity that is supplied to the intermediate chamber per time unit.

In certain embodiments, the feeding device is configured to generate within the intermediate chamber a test gas pressure (p) that is greater than a pressure ($p_1$) within the beam guiding chamber and operating pressure ($p_2$) within the vacuum chamber. The generation of an excess pressure relative to the pressure in the beam guiding chamber and the—substantially smaller—operating pressure in the vacuum chamber has been found to be advantageous, because it is thereby possible to act counter to the introduction of foreign substances in particular from the beam guiding chamber into the intermediate chamber.

In certain embodiments, the feeding device has a test gas pressure generating device, e.g., a reservoir, for providing the test gas with a feed pressure ($p_0$); and a throttle arranged between the test gas pressure generating device and the intermediate chamber. The test gas pressure generating device serves to provide the test gas with a constant (controlled) feed pressure. The test gas is introduced via the throttle into the intermediate chamber, wherein the test gas pressure in the intermediate chamber corresponds to the feed pressure of the pressure generating device during leak-free operation so that, during leak-free operation, no test gas reaches the intermediate chamber via the throttle. If there is a leak, only a slight gas quantity flows via the throttle into the intermediate chamber so that a test gas pressure that is smaller than the feed pressure occurs there. The pressure difference or the gas flow produced by the pressure difference through the throttle constitute a measure for leakage in the intermediate chamber.

A fixed throttle that has a throttle bore having a constant diameter is typically used as the throttle. The diameter of the throttle bore sets the sensitivity of the leak monitoring; the sensitivity of the monitoring increasing with a decreasing diameter of the throttle bore. A typical diameter of the throttle bore is on the order of approximately 0.1 mm in the present application.

In certain embodiments, the feeding device has a gas flow sensor arranged to determine a test gas flow (dv/dt) supplied to the intermediate chamber. As set out above, a conclusion can be drawn regarding the magnitude of the leakage in the intermediate chamber on the basis of the magnitude of the gas quantity flowing through the throttle per unit of time (that is to say, the test gas flow).

The supply device typically includes a supply line for the test gas. In the supply line, one or optionally more (small) openings may be provided in a targeted manner. These opening(s) allow(s) compensation for pressure variations that are brought about by temperature changes of the test gas and that could otherwise result in a leak of the intermediate chamber being indicated without a leak actually being present.

In other embodiments, the EUV radiation generating apparatus includes at least one pressure sensor for determining a test gas pressure (p) in the intermediate chamber. On the basis of the test gas pressure in the intermediate chamber, more specifically, on the basis of a decrease of the test gas pressure, it is also possible to draw a conclusion regarding a leak in or from the intermediate chamber. The leak may occur due to a failure of the first window, the second window, and/or the corresponding seals.

In some embodiments, the EUV radiation generating apparatus includes a vacuum generating device for generating an operating pressure in the vacuum chamber. A vacuum pump typically acts as the vacuum generating device. The operating pressure in the vacuum chamber, in which the target material is arranged, is typically on the order of magnitude of less than about 1.0 mbar. There is provided in the vacuum chamber a supply device for the target material, which guides the target material along a predetermined path that intersects with the target position.

In another embodiment, the EUV radiation generating apparatus includes a focusing device for focusing the laser beam at the target position. The focusing device may have a lens element that transmits the laser radiation and that is formed, for example, from zinc selenide. Additionally or alternatively to transmitting optical elements, reflective optical elements can also be used for focusing the laser beam at the target position.

In another further development, the focusing device is arranged within the vacuum chamber. In this instance, the beam guiding chamber can supply to the vacuum chamber a collimated laser beam which is first focused in the vacuum chamber. It will be understood that the focusing may optionally also be carried out completely or partially in the beam guiding chamber.

In another embodiment, at least one of the windows is configured as a plane-parallel plate, with preferably both windows being configured as plane-parallel plates. By being configured as plane-parallel plates, the windows have practically no optical effect on the laser beam, which typically strikes in a manner perpendicular to the plate plane. The material requirement of the material that transmits the laser beam is also low when plane-parallel plates are used, because the diameter of the plate or disc used has to be selected to be only slightly greater than the beam diameter of the laser beam, whereby the thickness of the plates can be selected to be comparatively small.

In another embodiment, at least one of the windows is formed from diamond; preferably both windows are formed from diamond. The use of windows comprising (synthetically produced) diamond has been found to be advantageous, because the heat introduced by the high laser power (>1 kW) of the laser beam can be effectively dissipated due to the high thermal conductivity of the diamond material. However, the production costs for the diamond material are comparatively high so that the thickness of the window should not be selected to be too large. Furthermore, for example, inadequate cooling may also result in the thermal destruction of the diamond material (burn-up) if a window with a comparatively great thickness is used.

In another embodiment, the beam guiding chamber has a device for expanding or spreading the laser beam. The $CO_2$ laser radiation used for generating EUV radiation has a high radiation power (for example, greater than 1 kW) so that it is advantageous to use comparatively large beam diameters in order to prevent the intensity of the laser radiation from becoming too large during passage through transmitting optical elements. The use of off-axis parabolic/paraboloid mirrors has been found to be advantageous in order to expand or spread the beam of the laser radiation having large beam diameters, as described, for example, in US 2011/0140008 A1.

Another aspect of the invention relates to methods for operating the EUV radiation generating apparatus of the type mentioned herein including: monitoring a leak of the intermediate chamber by means of a test gas pressure in the intermediate chamber and/or by means of a test gas flow of the test gas supplied to the intermediate chamber.

As described above, a pressure decrease in the intermediate chamber, which indicates a destruction or failure of one of the two windows, can be detected by comparing the test gas pressure or the test gas flow with an error threshold value. If the error threshold value is reached, an immediate deactivation of the EUV lithography system may be brought about, in which the valves or openings between different subassemblies of the EUV lithography system, in which, for example, the illumination system or the projection system are arranged, are closed. Alternatively or additionally, it is also possible for the vacuum environment to be filled or acted upon with an inert gas as a counter-measure.

The monitoring of the intermediate chamber for leaks by means of the test gas also allows a creeping change at the windows to be perceived so that counter-measures can be introduced or a warning can be provided before the windows are broken or destroyed. An increased leak of the intermediate chamber may be produced by a poor contact between the window and a frame or retaining member for the window, in particular a support face or abutment face of the frame acting as a seal. Such an inadequate mechanical contact may be an indication of a change in the abutment face and therefore an impediment to the thermal transport from the window to the material of the frame or retaining member, which acts as a heat sink for the window. An inadequately cooled window, for example, comprising diamond, heats up relatively quickly due to absorption and may be destroyed by overheating.

If the test gas pressure or the test gas flow is compared with a warning threshold value and if the warning threshold value has been reached, a warning can be output to an operator before the error threshold value is reached. The sealing and/or the frame of the window can thereby be checked and optionally replaced or repaired, for example, during maintenance work on the EUV radiation generating apparatus.

Other advantages of the invention will be appreciated from the description and the drawings. The above-mentioned features and those set out below can also be used individually or together in any combination. The embodiments shown and described are not intended to be understood to be a conclusive listing but instead are of exemplary nature for describing the invention.

DESCRIPTION OF THE DRAWING

In the drawings:

FIG. 1 is a schematic illustration of an EUV radiation generating apparatus that has a beam guiding chamber and a vacuum chamber as well as an intermediate chamber having a monitored pressure space.

DETAILED DESCRIPTION

FIG. 1 shows an EUV radiation generating apparatus 1 which has a driver laser device 2, a beam guiding chamber 3 and a vacuum chamber 4. A focusing device in the form of a focusing lens 6 is arranged in the vacuum chamber 4 in order to focus a $CO_2$ laser beam 5 at a target position Z. The EUV radiation generating apparatus 1 shown in FIG. 1 substantially corresponds to the structure, as described in US 2011/0140008 A1, the entire contents of which is incorporated herein by reference. For reasons of clarity, measurement devices for monitoring the beam path of the laser beam 5 have not been illustrated.

The driver laser device 2 comprises a $CO_2$ beam source and a plurality of amplifiers for producing a laser beam 5 having a high radiation power (>1 kW). Reference may be made to US 2011/0140008 A1 for a detailed description of possible constructions of the driver laser device 2. From the driver laser device 2, the laser beam 5 is redirected via a plurality of redirection mirrors 7 to 11 of the beam guiding chamber 3 and another redirection mirror 12 in the vacuum chamber 4 to the focusing lens 6, which focuses the laser beam 5 at the target position Z, at which tin is arranged as the target material 13.

The target material 13 is struck by the focused laser beam 5 and, in this instance, changed to a plasma state that serves to produce EUV radiation 14. The target material 13 is supplied to the target position Z by means of a supply device (not shown), which guides the target material along a predetermined path that intersects with the target position 6. Reference may also be made to US 2011/0140008 A1 for details of the supply of the target material.

A device 15 for increasing a beam diameter of the laser beam 5 is provided in the beam guiding chamber 3 and has a first off-axis parabolic mirror 16 having a first, convex-curved reflective surface and a second off-axis parabolic mirror 17 having a second, concave-curved reflective surface. The reflective surfaces of an off-axis parabolic mirror 16, 17 each form the off-axis segments of an (elliptical) paraboloid. The term "off-axis" means that the reflective surfaces do not contain the rotation axis of the paraboloid (and therefore also not the apex of the paraboloid).

As can also be seen in FIG. 1, an intermediate chamber 18 is arranged between the beam guiding chamber 3, more specifically, the housing thereof, and the vacuum chamber 4. A first window 19, which seals the intermediate chamber 18 in a gas-tight manner and which enables the laser beam 5 to enter the intermediate chamber from the beam guiding chamber 3, is fitted to the intermediate chamber 18, more specifically the housing wall thereof facing the beam guiding chamber 3. A second window 20 is fitted to the housing wall of the intermediate chamber 18 facing the vacuum chamber 4 and enables the laser beam 5 to exit from the intermediate chamber 18 into the vacuum chamber 4.

A vacuum pump 21 serves to generate in the vacuum chamber 4 an operating pressure $p_2$ which is in the fine or precise vacuum range (generally substantially lower than 1.0 mbar). The operation of the vacuum chamber 4 under vacuum conditions is necessary, because an excessively powerful absorption of the EUV radiation 14 produced would occur in a residual gas environment having excessively high pressure. Accordingly, the beam guiding chamber 3 or the inner space formed therein is operated at a substantially higher pressure $p_1$, which may be, for example, on the order of magnitude of approximately 5 mbar above atmospheric pressure (1013 mbar). The beam guiding chamber 3 is consequently placed under an excess pressure in a selective manner relative to the environment of the EUV beam generating apparatus 1 to protect the optical elements that are arranged in the beam guiding chamber 3 from contamination.

In the unlikely event that both windows 19, 20 are destroyed simultaneously, the gas from the beam guiding chamber 3 can be introduced into the inner space of the vacuum chamber 4 due to the pressure difference between the beam guiding chamber 3 and the vacuum chamber 4, and can carry residues or deposits of the target material 13 at that location and transport them to additional subassemblies (not illustrated in FIG. 1) of the EUV lithography system. Those subassemblies generally include an illumination system for illuminating a structure-carrying mask and an imaging system for imaging the structure on the mask onto a light-sensitive substrate (wafer). The additional subassemblies or the optical elements arranged therein can be contaminated by the target material, which may result in total failure of the EUV lithography system. In addition to the gas from the beam guiding chamber 3, cooling water can also be introduced into the inner space of the vacuum chamber 4 and can carry residues or deposits of the target material 13 at that location and transport those residues to additional subassemblies (not illustrated in the FIGURE) of the EUV lithography system.

The risk of such contamination can be substantially reduced by using a primary seal in the form of the second window 20 and a secondary seal in the form of the first window 19, because a simultaneous failure of both windows 19, 20—as mentioned above—is extremely improbable. If only the first window 19 is destroyed, although gas or liquid is introduced from the beam guiding chamber 3 into the intermediate chamber 18, the second window 20 prevents the introduction of that gas or liquid into the vacuum chamber 4. If the second window 20 is destroyed, for example, owing to thermal load, only the gas or liquid contained in the intermediate chamber 18 is introduced into the vacuum chamber 4. Since the volume of the vacuum chamber 4 is substantially greater in comparison with the volume of the intermediate chamber 18 (unlike the illustration in FIG. 1), the damage which the quantity of gas or liquid being introduced into the vacuum chamber 4 can cause is comparatively small.

Nevertheless, it is advantageous to detect as early as possible a leak in the intermediate chamber 18, which may be attributable to, for example, the destruction of one of the windows 19, 20, to be able to initiate suitable counter-measures in the event of a malfunction, for example, by openings or valves between the chambers of various subassemblies of the EUV lithography system being closed and/or the vacuum chamber 4 or the additional subassemblies being flooded with an inert gas to produce a pressure at that location that exceeds the pressure of the incoming gas and thus prevents the introduction thereof.

To monitor the intermediate chamber 18 for leaks, there is provided a feeding device 23 for a test gas 24, which has a test gas reservoir 25 as a test gas supply device that contains the test gas 24, for example, nitrogen or argon, and provides it at a constant (optionally controlled) feed pressure $p_0$. The test gas 24 is supplied via a supply line 27 to the intermediate chamber 18. There is provided in the supply line a fixed throttle 26 having a throttle bore that limits the test gas flow into the intermediate chamber 18.

If the intermediate chamber 18 is free from leaks, the pressure p in the intermediate chamber 18 corresponds to the feed pressure $p_0$ and no test gas 24 flows through the supply line 27 into the intermediate chamber 18. The test gas pressure p measured by a pressure sensor 28 for measuring the test gas pressure p in the intermediate chamber 18 consequently corresponds to the feed pressure $p_0$. The feed pressure $p_0$ (and therefore the test gas pressure p in the leak-free case) is greater than the pressure $p_1$ in the beam guiding chamber 3 and greater than the operating pressure $p_2$ of the vacuum chamber 4 and may be, for example, approximately 1023 mbar.

If a slight leak occurs due to a leakiness at one or both window(s) 19, 20, the test gas pressure p decreases compared to the supply pressure $p_0$. This can be evaluated by a leakage monitoring device 29, which is linked to the pressure sensor 28 with a signalling technology connection for this purpose.

A signalling technology connection to the supply device 23 is not necessary as long as the leakage monitoring device 29 has access to a storage device or memory in which is stored the numerical value for a fixedly predetermined supply pressure $p_0$ or a supply pressure $p_0$ that is controlled to a fixed value. It is understood that the leakage monitoring device 29 in the Figure is fitted to the intermediate chamber 18 only by way of example and can also be arranged at a different location in the EUV radiation generating apparatus 1.

The leakage monitoring device 29 can detect the destruction of one of the windows 19, 20 on the basis of a sudden, powerful pressure decrease in the intermediate chamber 18 by comparing the measured test gas pressure p in the intermediate chamber 18 with an error threshold value for the test gas pressure p. If the test gas pressure p falls below the error threshold value, counter-measures are immediately initiated to protect the optical elements, which are arranged in the vacuum chamber 4 or in additional vacuum chambers connected thereto, from contamination (see above).

The leakage monitoring device 29 reacts very sensitively to small leaks of the intermediate chamber 18 if a diameter of the throttle bore is suitably selected (for example, approximately 0.1 mm), as may occur, for example, in the case of incomplete sealing of the windows 19, 20 against the housing of the intermediate chamber 18, more specifically against a retaining member or a frame provided at that location. The detection of small leak quantities may provide an indication that undefined conditions are present at the components of the beam guiding chamber 3. By comparing the measured test gas pressure p with a warning threshold value, it is possible to react to such a condition, where applicable, before an error occurs or total failure of one of the windows 19, 20 occurs. When the warning threshold value is reached, for example, an acoustic or optical warning can be output to an operator so that he can carry out maintenance and inspection of the frame or the abutment faces of the windows 19, 20.

Such an early warning of a possible destruction of the windows 19, 20 is particularly advantageous when using diamond as the window material, because a replacement necessary due to the burn-up or destruction of a diamond window 19, 20 involves substantial costs. However, the use of diamond as window material is advantageous due to its high thermal conductivity.

Alternatively or additionally (as shown in the FIGURE) to the measurement of the test gas pressure p in the intermediate chamber 18, it is also possible to carry out a measurement of the test gas flow dv/dt of the test gas 24 flowing through the supply line 27 by means of a gas flow sensor 30. The test gas flow dv/dt disappears without any leak, because in this instance the supply pressure $p_0$ and the pressure p in the intermediate chamber 18 are the same. The test gas flow increases with a decreasing test gas pressure p in the intermediate chamber 18 (in accordance with an increasing pressure difference between the feed pressure $p_0$ and the test gas pressure p in the intermediate chamber 18). The test gas flow dv/dt can also be compared with an error threshold value or a warning threshold value by the leakage monitoring device 29 to detect an error or to output a warning.

Changes in the pressure p in the intermediate chamber 18 can also be brought about by temperature changes of the test gas 24. This could result in an error message, where applicable, without a leak actually occurring in the intermediate chamber 18. To compensate for such temperature-related pressure changes, a leak or a (small) opening can be created in a targeted manner in the supply line 27, by which the test gas 24 is connected to the environment to provide pressure compensation.

In the manner described above, the operational safety and reliability of the EUV radiation generating apparatus can be substantially increased. It will be understood that it is possible to dispense with the supply of a test gas to monitor leaks if the gas pressure in the intermediate chamber is monitored directly by means of a pressure sensor.

The invention claimed is:

1. An extreme ultraviolet (EUV) radiation generating apparatus comprising:

a laser source to generate a laser beam;

a vacuum chamber;

a laser beam guiding chamber arranged to guide a laser beam from the laser source to a target position within the vacuum chamber where a target material can be positioned for generation of EUV radiation;

an intermediate chamber arranged between the vacuum chamber and the beam guiding chamber, wherein the intermediate chamber comprises a first window arranged for entry of the laser beam from the laser beam guiding chamber into the intermediate chamber; and a second window arranged for exit of the laser beam from the intermediate chamber into the vacuum chamber, wherein the first and second windows provide a gas-tight seal for the intermediate chamber; and a test gas feeding device arranged to supply a test gas to the intermediate chamber.

2. The EUV radiation generating apparatus according to claim 1, wherein pressure ($p_1$) within the beam guiding chamber is higher than pressure outside the EUV radiation generating apparatus.

3. The EUV radiation generating apparatus according to claim 1, further comprising:

a leakage monitoring device arranged to monitor a leak of the supplied test gas from the intermediate chamber.

4. The EUV radiation generating apparatus according to claim 1, wherein the test gas feeding device is arranged to generate within the intermediate chamber a test gas pressure (p) which is greater than a pressure ($p_1$) within the beam guiding chamber and an operating pressure ($p_2$) within the vacuum chamber.

5. The EUV radiation generating apparatus according to claim 1, wherein the test gas feeding device comprises:

a test gas pressure generating reservoir that provides the test gas with a feed pressure ($p_0$); and a throttle arranged between the test gas generating reservoir and the intermediate chamber.

6. The EUV radiation generating apparatus according to claim 5, wherein the feeding device comprises a gas flow sensor arranged to determine flow (dv/dt) of the test gas supplied to the intermediate chamber.

7. The EUV radiation generating apparatus according to claim 2, further comprising at least one pressure sensor for determining a test gas pressure (p) in the intermediate chamber.

8. The EUV radiation generating apparatus according to claim 1, further comprising a vacuum generating device for generating a working pressure ($p_2$) in the vacuum chamber.

9. The EUV radiation generating apparatus according to claim 1, further comprising a focusing device for focusing the laser beam at the target position.

10. The EUV radiation generating apparatus according to claim 9, wherein the focusing device is arranged within the vacuum chamber.

11. The EUV radiation generating apparatus of claim 1, wherein at least one of the windows is configured as a plane-parallel plate.

12. The EUV radiation generating apparatus of claim 1, wherein at least one of the windows comprises diamond.

13. The EUV radiation generating apparatus according to claim 1, wherein the laser beam guiding chamber comprises a beam-enlarging device for expanding the laser beam.

14. A method for operating an extreme ultraviolet (EUV) radiation generating apparatus, wherein the apparatus comprises:

a laser source to generate a laser beam;

a vacuum chamber;

a laser beam guiding chamber arranged to guide a laser beam from the laser source to a target position within the vacuum chamber where a target material can be positioned for generation of EUV radiation;

an intermediate chamber arranged between the vacuum chamber and the beam guiding chamber, wherein the intermediate chamber comprises a first window arranged for entry of the laser beam from the laser beam guiding chamber into the intermediate chamber; and a second window arranged for exit of the laser beam from the intermediate chamber into the vacuum chamber, wherein the first and second windows provide a gas-tight seal for the intermediate chamber; and a test gas feeding device arranged to supply a test gas to the intermediate chamber;

the method comprising:

guiding the laser beam to the target material positioned at the target position; and monitoring a leak of the intermediate chamber by monitoring one or both of a test gas pressure (p) within the intermediate chamber and a flow (dv/dt) of test gas supplied to the intermediate chamber from the test gas feeding device.

15. The method according to claim 14, wherein pressure ($p_1$) within the laser beam guiding chamber is higher than pressure outside the EUV radiation generating apparatus.

16. The method according to claim 14, wherein the EUV radiation generating apparatus further comprises a leakage monitoring device arranged for monitoring a leak of the supplied test gas from the intermediate chamber.

17. The method according to claim 14, wherein the test gas feeding device is arranged to generate within the intermediate chamber a test gas pressure (p) which is greater than a pressure ($p_1$) within the beam guiding chamber and an operating pressure ($p_2$) within the vacuum chamber.

* * * * *